(12) United States Patent
Heinz et al.

(10) Patent No.: US 9,791,585 B2
(45) Date of Patent: Oct. 17, 2017

(54) CONSTANT PHASE

(71) Applicant: The United States of America, as represented by the Secretary of the Army, Washington, DC (US)

(72) Inventors: Daniel Charles Heinz, Perry Hall, MD (US); Adam William Melber, Churchville, MD (US); Thomas Albert Burst, Chapel Hill, NC (US); Michael Leonard Brennan, Howell, NJ (US); Michael Steer, Raleigh, NC (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 0 days.

(21) Appl. No.: 15/482,922

(22) Filed: Apr. 10, 2017

(65) Prior Publication Data

US 2017/0212268 A1    Jul. 27, 2017

Related U.S. Application Data

(62) Division of application No. 14/263,050, filed on Apr. 28, 2014, now Pat. No. 9,651,703.

(51) Int. Cl.
| | |
|---|---|
| *G01V 3/08* | (2006.01) |
| *G01V 3/10* | (2006.01) |
| *G01V 3/15* | (2006.01) |
| *H01Q 7/00* | (2006.01) |
| *G01V 3/165* | (2006.01) |

(52) U.S. Cl.
CPC .................. *G01V 3/165* (2013.01)

(58) Field of Classification Search
CPC .................................. G01V 3/10; G01V 3/15
USPC .......................................... 324/329; 343/866
See application file for complete search history.

(56) References Cited

U.S. PATENT DOCUMENTS

| | | |
|---|---|---|
| 2,166,750 A | 7/1939 | Carter |
| 4,373,163 A | 2/1983 | Vandebult |
| 4,922,261 A | 5/1990 | O'Farrell |
| 5,061,941 A | 10/1991 | Lizzi et al. |
| 5,198,746 A | 3/1993 | Gyugyi et al. |
| 5,459,451 A | 10/1995 | Crossfield et al. |
| 5,523,749 A | 6/1996 | Cole et al. |
| 5,914,692 A | 6/1999 | Bowers et al. |
| 6,166,706 A | 12/2000 | Gallagher, III et al. |
| 6,172,608 B1 | 1/2001 | Cole |
| 6,388,628 B1 | 5/2002 | Dettloff et al. |

(Continued)

OTHER PUBLICATIONS

Yamnazaki, et al., Basic Analysis of a Metal Detector, IEEE Trans. Instrumentation and Measurement, vol. 51, No. 4, pp. 810-814, Aug. 2002.

(Continued)

*Primary Examiner* — Bot Ledynh
(74) *Attorney, Agent, or Firm* — Ronald Krosky; Azza Jayaprakash (57) ABSTRACT

Various embodiments are described that relate to a loop with a constant phase. The loop can function as an antenna and be used in object detection. A current source can be used to power the loop such that the loop produces a magnetic field and an electric field. The magnetic field can be powerful enough to detect a dielectric while the electric field is so small that it does not interfere with nearby communication equipment. Thus, detection can occur without disruption of other important devices.

20 Claims, 10 Drawing Sheets

(56) References Cited

U.S. PATENT DOCUMENTS 6,960,984 B1    11/2005  Vicci et al.

OTHER PUBLICATIONS

Jalaly and Robertson, RF Barcodes using Multiple Frequency Bands, Microwave Symposium Digest, 2005 IEEE MTT-S International, Jun. 2005.
Jalaly and Robertson, Capacitively-Tuned Split Microstrip Resonators for RFID Barcodes, European Microwave Conference, Oct. 2005.
Vania, PRF-1150 1KW 13.56 MHz Class E RF Generator Evaluation Module, Direct Energy, Inc. Technical Note, 2002.
Wikipedia, http://en.wikipedia.org/wiki/Magnetic_loop, version last modified on Mar. 31, 2014 at 12:17.
Overton, et al., Inside the Metal Detector, 2012, Geotech Press, pp. viii, 13, and 17.

CONSTANT PHASE

CROSS-REFERENCE

The application is a Divisional Application of, and claims priority to, U.S. application Ser. No. 14/263,050 filed on Apr. 28, 2014. The entirety of U.S. application Ser. No. 14/263,050 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

A powered loop antenna can be used to detect a hidden object. For example, a person on vacation can use a powered loop antenna functioning as an anomaly detector in an attempt to locate buried objects at a beach. In addition to using the anomaly detector, the person can employ a communication device, such as a two-way radio with a child also participating in the same activity. Thus, a person may want to use a detector device and a communication device concurrently.

SUMMARY

In one embodiment, a system comprises a set of wire sections and a set of reactive compensation elements. The set of wire sections and the set of reactive compensation elements are configured to form a loop powered by a current provided by a current source operating at about 1 megahertz or above with a source impedance of about 25 ohms or less. The individual reactive compensation elements and the individual wire sections of the set of wire sections alternate with one another. The set of reactive compensation elements function to keep a magnitude and a phase of the current substantially uniform throughout the loop. The loop, when powered by the current, produces a magnetic field that is substantially greater than an electric field along a longitudinal axis of the loop.

In one embodiment, a singular loop antenna comprises a first wire section, a second wire section that is distinct from the first wire section, and a third wire section that is distinct from the first wire section and distinct from the second wire section, where the first wire section and the third wire section are not contiguous. The singular loop antenna also comprises a first reactive compensation element that divides the first wire section from the second wire section and a second reactive compensation element that divides the second wire section from the third wire section and that is distinct from the first reactive compensation element. The first wire section, the second wire section, the third wire section, the first reactive compensation element, and the second reactive compensation element form at least part of a loop powered by a current of at least two amps supplied from a low impedance current source. The singular loop antenna, when supplied with the current, produces a magnetic field that is substantially greater than the electric field along a longitudinal axis of the singular loop antenna. The first reactive compensation element offsets an impedance of the first wire section and the second reactive compensation element offsets an impedance of the second wire section. A magnitude is keep substantially constant throughout the loop such that the magnitude change is not greater than that which is produced by no more than one of the wire sections. A phase is keep substantially constant throughout the loop such that the phase change is not greater than that which is produced by no more than one of the wire sections.

In one embodiment, a system comprises a current source that functions at under about one ohm with a frequency between about 1 megahertz and 1 gigahertz and a singular small loop antenna that is powered by the current. The singular small loop antenna comprises a set of wire segments that are individually divided by a set of reactive compensation elements such that two individual reactive compensation elements are separated by a segment of wire and two individual reactive compensation elements are separated by a reactive compensation element. Also, the singular small loop antenna produces an electric field and a magnetic field such that the magnetic field, that extends substantially normal to a plane of the singular small loop antenna, is substantially greater than the electric field and the electric field is of a level that does not substantially interfere with communication equipment.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

A powered loop antenna (e.g., a singular loop or multiple loops) can be employed that operates from 1 megahertz to 1 gigahertz. In particular, powered small loop antennas can be employed where the antenna size is less than a ¼ wavelength in size, in which the currents along a conductor of the antenna are mostly in phase. Symmetry of the loop antenna can be such that a propagating electromagnetic (EM) field (e.g., a transverse EM field) is not produced normal to the loop. Instead, a radiation pattern can peak in directions in the plane of the loop. Since cancellation may not be complete (e.g., due to the phase difference between the arrival of the wave at the near and far sides of the loop), a similar argument may not apply to signals received in that plane (e.g., that voltages induced by an impinging radio wave would cancel along the loop). A small (e.g., <¼λ) magnetic loop antenna can be circular with the feed point at one end. A variable air capacitor can be inserted at the top opposite the feed point for matching to 50Ω. An antenna with this configuration can have a high quality with narrow bandwidths of only a few kilohertz. A primary goal of this type of antenna can be to provide an effective radiator with a good far field pattern.

Aspects disclosed herein can be used to optimize an antenna design to produce an antenna with very strong magnetic near fields. A small loop antenna can be divided into k sections (with k as an integer) and can include a reactive compensation element for controlling generation of a local magnetic field between sections. The reactive compensation element can be coupled to one of the k sections and have a reactance that substantially cancels the series reactance of a section at an operating frequency.

A powered loop antenna can be constructed and deployed that combines a low impedance current source (e.g., a source impedance of about 1 ohm) with a low real impedance reactively compensated loop antenna designed to operate at a frequency or set of frequencies between 1 megahertz and 1 gigahertz. Operation of a sensor (e.g., powered loop antenna) can be dependent on a magnetic field that is projected and that in turn is directly related to the current in the magnetic current loop. In one example, a 50 ohm amplifier can benefit from matching resulting in a narrow bandwidth and excessive operational sensitivity. A radio frequency (RF) current source can provide a bandwidth of greater than 10%. This can allow for greater flexibility of mounting configurations. Using a 50 ohm power amplifier with the powered loop antenna can benefit from a matching network to transform from 50 ohms to approx. $1 \pm j3$ ohms. Thus, a voltage controlled current source can feed to a 50 ohm power amplifier which is then impedance matched to $1 \pm j3$ ohms. This process can provide for a maximum bandwidth of about 1% and results in relatively poor efficiency. Use of an RF current source and/or an RF power amplifier that drives a low impedance magnetic sensor can result in a minimum of a 10× increase in bandwidth and approximately a 5-10× reduction in power with the sensor operating at approx. $1 \pm j3$ ohms. This type of sensor can penetrate the ground to detect deeply buried threats, such as landmines, etc., while its design reduces unwanted electromagnetic (EM) interference. Applications of such a sensor (e.g., powered loop antenna) can include metal/anomaly sensors, induction charging (e.g., wireless charging) systems, communication with active or passive tags, etc.

A large magnetic field can be transmitted while minimizing generation of a propagating EM wave can be done by use of a current loop in which the current around the loop has a constant magnitude and a constant phase. A conventional current loop sensor can have the current phase change around the loop and this phase change generates a propagating EM signal. By keeping both the magnitude and phase constant, little EM signal is projected, but a strong magnetic signal is produced that extends normal to the plane of the loop creating a large magnetic field in the near field. This field can penetrate conducting dielectrics such as ground, which have little effect on the magnetic field but substantially terminate the electric field and thus propagate an EM wave. In one embodiment an in-phase current loop is created using multiple small loops. In one embodiment, an in-phase current loop design can be built in which reactive compensation is used. Periodic series capacitors can be placed around the loop to compensate for time-of-flight phase change along a segment of the loop. Thus a magnetic current loop can be used in a magnetic-current-loop-based communication system. In one embodiment, the loop can be divided into small segments and a reactive compensation element can be added to the segments. Adding reactive compensation to the segments of the loop cancels series reactance of the segment of the loop and provides for current magnitude and phase uniformity along the loop at a given instant in time. Therefore, a loop can be created with impedance at 13.56 megahertz that is around $1 \pm j3$ ohms.

Therefore, as with the standard small loop antenna in which the current is mostly in phase around the loop, a design implementing aspects disclosed herein can force the current to be even more in phase. Current loop antennas can provide for narrowband operation due to the use of the impedance tuner to transform from the low real impedance of the loop (around a few ohms) to the 50 ohm impedance of an RF generator. This transformation process can reduce the bandwidth of a system. A high power detector can be used to locate objects underground, whether these objects are metal or are of a dielectric material. To achieve this level of detection a relatively strong current source can be used, such as a source producing about an amp or greater of current. This strong current source can produce a relatively strong magnetic field that can be used to facilitate the detection. However, this strong current source can also produce a relatively strong electric field. The relatively large electric field can disrupt nearby equipment, such as communication devices.

Therefore, it can be desirable in at least some circumstances to have a detector that produces a relatively strong magnetic field with a relatively weak electric field. In other words, it can be desirable to employ a detector capable of detecting metal and/or a dielectric while not substantially impacting a communication device or other nearby devices. In order to do this, the detector can include a set of wire segments separated by a set of capacitors configured as a loop. This configuration can enable the phase to be constant throughout the loop. The capacitors can be set at values to reduce and/or minimize the electric field.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1:
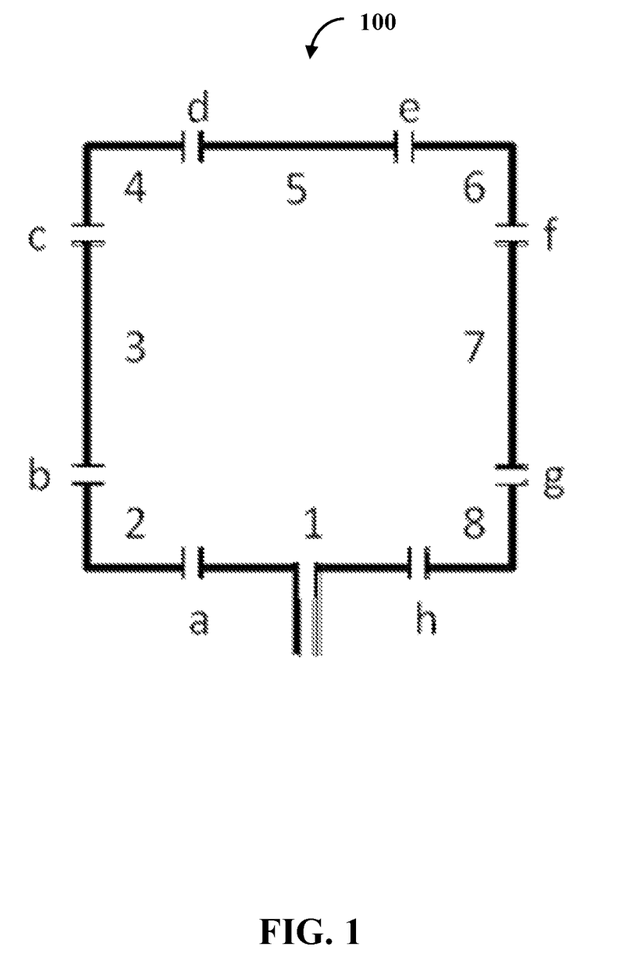
FIG. 1 illustrates one embodiment of a system comprising a set of wire sections and a set of capacitors.

FIG. 1 illustrates one embodiment of a system 100 comprising a set of wire sections 1-8 and a set of capacitors a-h. The capacitors a-h can function as example reactive compensation elements. The set of wire sections 1-8 and the set of capacitors a-h are shown as forming a loop (e.g., a rectangular loop) with the individual capacitors of the set of capacitors a-h and the individual wire sections 1-8 alternating with one another. The individual capacitors of the set of capacitors a-h can be substantially evenly distributed (e.g., equidistant) from themselves and be configured to be in series around the loop. The loop can be supplied a current from a current source. The set of capacitors a-h can function to keep a magnitude and a phase of the current substantially uniform throughout the loop. In one embodiment, the current can be at least about one amp operating at about one megahertz or above with a source impedance of about 25 ohms or less and in turn the loop produces an electric field that is substantially less than the magnetic field.

The magnetic field can be of a sufficient strength to detect a metal and/or to detect a dielectric. The magnetic field extends about one wavelength from the loop, such as a wavelength that is about twenty-two meters (e.g., a wavelength that corresponds to a frequency of about 13.56 megahertz (MHz)). In one embodiment, the loop can perform transmission and/or reception functions. The loop can be a small loop antenna.

Aspects disclosed herein can be used to improve and/or optimize antenna design such that the antenna produces a strongest magnetic near to mid-field as possible for forward detection of metal objects or other objects. Further, the antenna can be used to transfer power and information between microelectronic devices. The H-Field associated with the antenna can be relatively high and a drop off can be about $1/r^2$ (e.g., r=radius). In one example, the frequency of operation for the system 100 can be from about 1 MHz to about 1 Gigahertz (e.g., about 13.56 MHz). To keep the size of the system 100 relatively small the small loop antenna configuration can be employed.

Currents along a conductor of the system 100 can be mostly in phase. Symmetry of the system 100 can allow for a propagating electromagnetic (EM) field (e.g., a transverse EM field) that is not produced normal to the loop. Instead, a radiation pattern can peak in directions in the plane of the loop. For signals received in that plane (e.g., voltages induced by an impinging radio wave would cancel along the loop) this may not occur since cancellation may not be complete due to the phase difference between an arrival of the wave at the near and far sides of the loop. A conventional small (<1/4λ, where λ=wavelength) magnetic loop antenna can be circular with the feed point at one end. This circular antenna can include a variable air capacitor at a top opposite with a feed point for matching to 50 Ω. The conventional antenna can have a very high Q-factor with narrow bandwidths of only a few kilohertz. Thus, this type of antenna may be able to provide an effective radiator with a good far field pattern but poor near or middle field pattern.

Aspects disclosed herein can be used to optimize antenna design to produce very strong magnetic near fields. The small loop antenna can be divided into k sections, where k is an integer, and a reactive compensation element set (e.g., capacitors a-h) can be employed for controlling generation of the local magnetic field between the wire sections 1-8. The reactive compensation element can be coupled to one of the k sections and have a reactance that substantially cancels the series reactance of each section of the wire sections 1-8 at an operating frequency. Therefore, as with the standard small loop antenna in which the current is mostly in phase around the loop, the system 100 can force the current to be even more in phase.

The system 100 can have the current with a constant magnitude and constant phase. This current can cause the system 100 to produce a large magnetic field while minimizing a generation of a propagating EM wave. Absent the set of capacitors a-h the current changes phase around the loop and this phase change generates a propagating EM signal. By keeping both the magnitude and phase constant, relatively little EM signal is projected, but a strong magnetic signal is produced that extends normal to the plane of the loop creating a large magnetic field in the near field. This large magnetic field can penetrate conducting dielectrics such as ground which have little effect on the magnetic field but substantially terminate the electric field and thus, a propagating EM wave. Periodic series capacitors placed around the loop compensate for the time-of-flight phase change along a segment of the loop. As the phase changes while the current passes through an individual wire section of the system 100, an individual capacitor of the system 100 undoes the phase change.

In one embodiment, the system 100 can be used in a magnetic-current-loop-based communication system. The system 100 is divided into small segments and reactive compensation is added to each segment, such as by an individual capacitor. Adding reactive compensation to segments of the loop cancels the series reactance of the wire section and provides for current magnitude and phase uniformity along the loop at an instant in time.

The large magnetic field can be transmitted while minimizing the generation of the propagating EM by using the loop such that the current around the loop has a constant magnitude and a constant phase. Without the set of capacitors a-h, current of a capacitor-less loop would change phase around the capacitor-less loop and this phase change would generate a propagating EM signal that could interfere with communication equipment. By keeping both the magnitude and phase constant in the loop as the system 100, relatively little EM signal can be projected but a strong magnetic signal can be produced that extends normal to a plane of the loop, creating a large magnetic field in the near field. This field can penetrate conducting dielectrics such as ground which have little effect on the magnetic field but substantially terminate the electric field and thus a propagating EM wave. An in-phase current loop can be created using multiple loops or a singular loop.

Aspects disclosed herein can have applicability in various industries and/or products. In one example, devices that respond to a magnetic wave (e.g., change state, become jammed, etc.) can be triggered by practice of aspects disclosed herein. In one example, hobbyists can use a detector built in accordance with aspects disclosed herein for artifact collection. In one example, a detector can be built in accordance with aspects disclosed herein and used in construction to detect objects underground before digging.

In one embodiment, unique phase characteristics can appear in the response from an interrogated object (e.g., a target) excited with the magnetic wave during exposure to the magnetic field and/or after the magnetic field is removed. Altering a pulse shape can force leading and middle sections of the pulse to induce unique phase information. This alteration can be done by the interrogated object either passively, semi-passively, or actively. In one embodiment, the interrogated object can be a passive object, (e.g., an asset management tag or landmine) that can have a prescribed response (e.g., landmine detonation) imparting a prescribed phase characteristic in a trailing response. In a semi-passive example the tag (e.g., a tag powered by a battery) can rectify an applied magnetic field pulse and impart digital information in the falling phase response by, for example, superimposing information on a trailing edge by opening and closing a loop antenna, or other antenna. In an active example, the tag can be self-powered and can actively alter its characteristics in the trailing edge of the magnetic pulse to impose digital information in the phase response. In one embodiment, the tag can be powered by a battery.

Figure 2:
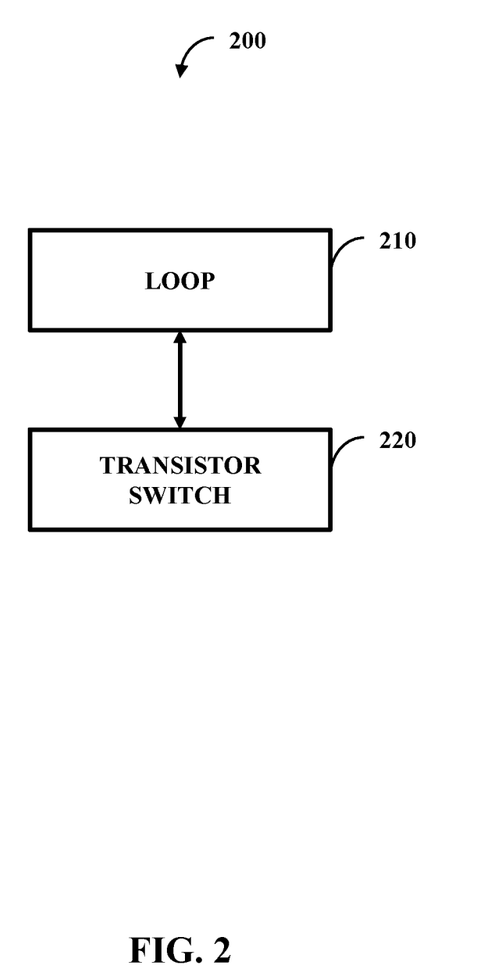
FIG. 2 illustrates one embodiment of a system comprising a loop and a transistor switch.

FIG. 2 illustrates one embodiment of a system 200 comprising a loop 210 and a transistor switch 220 (e.g., the transistor switch 220 can be part of the tag). In one embodiment, the loop 210 is the system 100 of FIG. 1. The transistor switch 220 can be configured to alter characteristics of the loop 210 (e.g., when the loop functions as a small loop antenna) in a binary manner such that direct current is produced to power an active circuit (e.g., active circuit connected to the tag). In one example, the loop 210 rectifies a current to provide direct current that powers an active circuit. The tag can alter the antenna characteristics, for example using the transistor switch 220, to change the characteristics of a loop antenna. If the antenna characteristics are altered in a binary fashion then binary information can be returned to a reader in a trailing phase characteristic.

Figure 3:
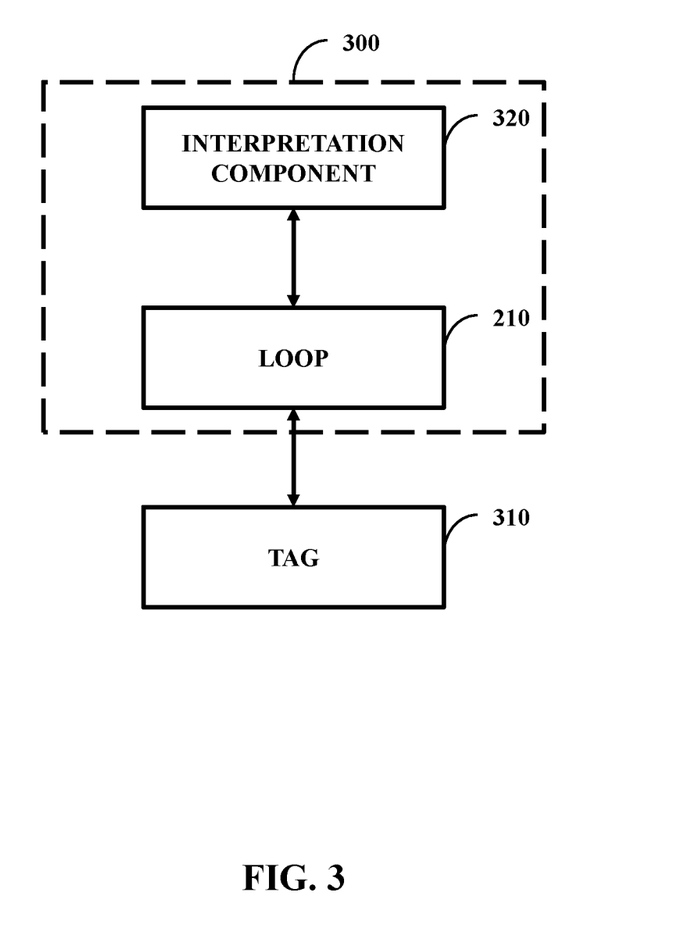
FIG. 3 illustrates one embodiment of a system comprising the loop that interacts with a tag and an interpretation component.

FIG. 3 illustrates one embodiment of a system 300 comprising the loop 210 interacting with a tag 310 (e.g., the tag 310 can retain the transistor switch 220 of FIG. 2) and an interpretation component 320. The interpretation component 320 can be configured to interpret a barcode value of the tag 310 from a response of the tag 310 to the magnetic field, where the tag response is based, at least in part, on value and placement of a set of capacitors of the tag 310. The magnetic field of the loop 210 can interact with the tag 310 and the tag 310 can produce a response from this interaction. The loop 210 can receive this response and the response can be interpreted by the interpretation component 320. This response can be based on the placement and/or value of individual capacitors of the tag 310 such that the tag 310 is identifiable as a bar code.

In one embodiment, a tuner component can be employed to select the values of the individual capacitors of the set of capacitors a-h of FIG. 1 such that the electric field is minimized. The individual capacitors of the set of capacitors a-h of FIG. 1 can be uniform in value or not uniform in value (e.g., each capacitor has distinct value and/or at least one capacitor has a value different from another capacitor). In one embodiment, the tuner component can select values of individual capacitors of the tag 310 such that the tag 310 is an identifiable barcode. In one example, arrangement (e.g., number and spacing) of the individual capacitors as well as the values of the individual capacitors can be part of the identifiable barcode.

In one embodiment, the trial and error can be used to create a database of optimal capacitor values (e.g., to create strongest magnetic field, to create smallest electric field, for barcode usage, etc.). Selection can comprise identifying a desired characteristic of the loop 210 (e.g., smallest electric field along a longitudinal axis of the loop 210) and reading the database values. This can be compared with available capacitor values and values can be selected and implemented. In one embodiment, the tuner component can select a frequency for the loop 210 (e.g., a frequency between 1 MHz and 1 gigahertz) such that the electric field is minimized. In one embodiment, the tuner component can read an instruction for capacitor values for the individual capacitors of the tag 310 and set the values accordingly.

Figure 4:
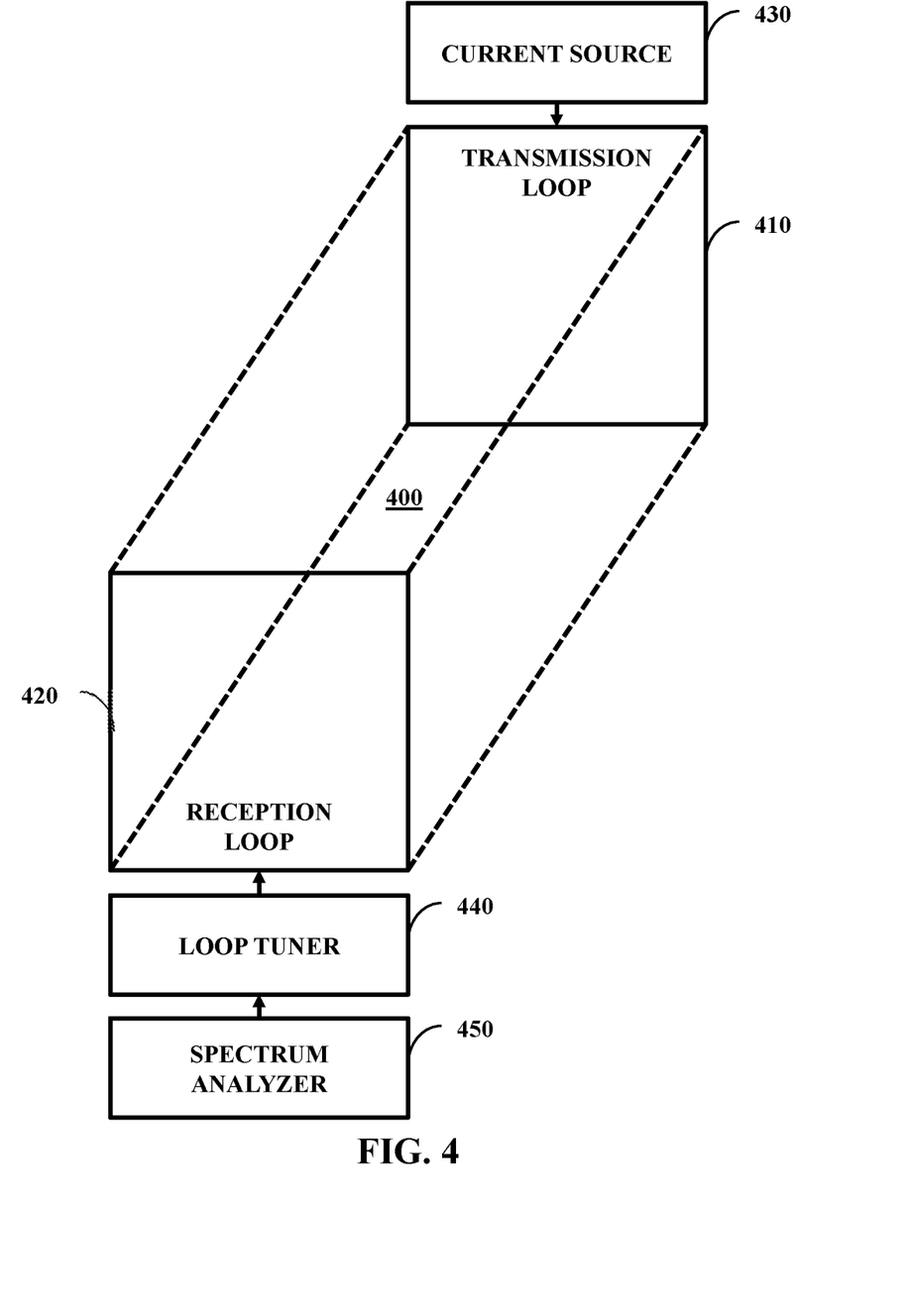
FIG. 4 illustrates one embodiment of a system comprising a transmission loop and a reception loop.

FIG. 4 illustrates one embodiment of a system 400 with a transmission loop 410 and a reception loop 420. An area between the transmission loop 410 and the reception loop 420 can be a strongest area to identify an object of interest. In one example, a metal object between the loops 410 and 420 can give a stronger reading than the metal object outside the loops 410 and 420 (e.g., to the side of the loops, behind the reception loop 420, etc.). Thus, the two loops 410 and 420 can be used together as a detector and be powered by a current source 430.

Various items can be associated with the system 400 that facilitates performance of the system 400 as a successful detector. The reception loop 410 can be associated with a loop tuner 440 and a spectrum analyzer 450. The spectrum analyzer 450 can interpret results from a loop, such as the transmission loop 420 or the loop 210 of FIG. 2. In one embodiment, the spectrum analyzer 450 can be configured to identify a presence of an object (e.g., metal or dielectric) between the reception loop 420 and the transmission loop 410. The presence can be determined through interference of the magnetic field from the transmission loop 410 to the reception loop 420. Thus, how the magnetic field differs from leaving the transmission loop 410 to being received by the reception loop 420 can be used by the spectrum analyzer 450 to determine detection. The spectrum analyzer 450 can be configured to identify a presence of an object near one of the loops (e.g., on the side of the reception loop 420 that does not face the transmission loop 410) by way of magnetic field observance. The spectrum analyzer 450 can also be configured to cause an output indicative of the presence (e.g., cause a light to flash, send a communication, etc.). The spectrum analyzer 450 can function at a set value, such as at 50 ohms. Since the transmission loop 420 or the loop 210 of FIG. 2 can function at lower resistance levels, the loop tuner 440 can be employed to match output of the reception loop 420 to 50 ohms. Therefore, the loop tuner 440 can function to match impedance. In one embodiment, the reception loop 420 matches the transmission loop 410 (e.g., is identically structured). The reception loop 420 can receive the magnetic field. Thus, the transmission loop 410 and reception loop 420 can form a detector. A detectable object, such as a metal or dielectric, penetrates the magnetic field such that the magnetic field becomes modified. Modification of this field can be identified by the spectrum analyzer 450 and be used to identify existence of the object.

While the system 400 is shown with one transmission loop 410 and one reception loop 420, other configurations can be implemented. In one example, two reception loops 420 can be used—one loop 420 on one side of the transmission loop 410 and one loop 420 on the other side. Data from the reception loops 420 can be merged by a differential amplifier and then fed to the loop tuner 440 and/or the spectrum analyzer 450 (e.g., the differential amplifier can be part of a device that includes the loop tuner 440, the differential amplifier can be part of the loop tuner 440, the differential amplifier functions on output of the reception loop 420 after the loop tuner 440 functions on the output, etc.). The digital amplifier can merge data (e.g., output) from the multiple loops so the spectrum analyzer can treat the data as one set of data.

Figure 5:
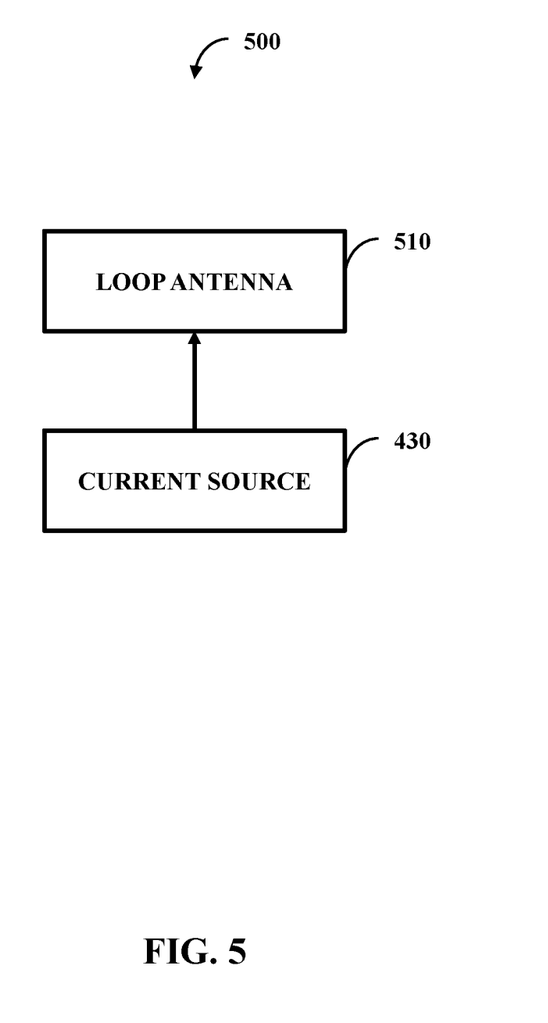
FIG. 5 illustrates one embodiment of a system comprising a loop antenna and a current source.

FIG. 5 illustrates one embodiment of a system 500 comprising a loop antenna 510 and a current source 430. In one embodiment, the loop antenna 510 (e.g., a rectangular loop antenna) is a small loop antenna such as a singular small loop antenna (one loop) or a multiple small loop antenna (more than one loop). The loop antenna 510 can be powered by a current (e.g., a current of at least one amp) produced from the current source 430. The current source 430 can be a low impedance current source (e.g., a current source operating at less than about 25 ohms with a frequency of at least 1 MHz). The loop antenna 510 can comprise a set of wire segments that are individually divided by a set of capacitors such that two individual capacitors are separated by a segment of wire and two individual capacitors are separated by a capacitor. This configuration of the loop antenna 510 can be the configuration of the system 100 of FIG. 1 and/or can function as the loop 210 of FIG. 2. The loop antenna 510 can produce an electric field and a magnetic field such that the magnetic field, which extends substantially normal to a plane of the loop antenna 510, is substantially greater than the electric field. The electric field can be of a level that does not substantially interfere with communication equipment (e.g., does not hinder communication equipment from functioning, does not provide a noticeable disturbance to communication equipment, etc.) and the magnetic field can be of a high enough level to detect a metal beneath a surface.

In one embodiment, the loop antenna 510 can form a loop that is powered by the current source 430 with a current of at least two amps. When supplied with the current the loop antenna 510 produces a magnetic field that is substantially greater than the electric field. Throughout the loop antenna 510 the magnitude and phase can be kept substantially constant. In one example, the magnitude is kept substantially constant throughout the loop such that the magnitude change is not greater than that which is produced by no more than one of the wire sections and a phase is kept substantially constant throughout the loop such that the phase change is not greater than that which is produced by no more than one of the wire sections. Thus, when a phase and/or magnitude change is impacted by a wire section (e.g., a largest wire section), the capacitor offsets the change before the next wire section is impacted.

The loop antenna 510 can comprise a first wire section (e.g., wire section 2 of FIG. 1), a second wire section (e.g., wire section 3 of FIG. 1), and a third wire section (e.g., wire section 4 of FIG. 1). These wire sections can be distinct from one another (e.g., not the same wire section) and be in series with one another (e.g., the first wire section and the third wire section are not contiguous). The loop antenna 510 can also comprise a first capacitor (e.g., capacitor b of FIG. 1) that divides the first wire section from the second wire section as well as a second capacitor (e.g., capacitor c of FIG. 1) distinct from the first capacitor that divides the second wire section from the third wire section and that is distinct from the first capacitor. The first capacitor can have a value that causes the electric field to be minimized and the second capacitor can have a value that causes the electric field to be minimized. The first capacitor can offset an impedance of the first wire section while the second capacitor can offset an impedance of the second wire section. Thus, impedances of the wire sections can quickly be offset by the capacitors throughout the loop antenna 510.

In one embodiment, the magnetic field extends about one wavelength from the loop antenna 510. In one example, the loop antenna 510 can function with a frequency of about 13.56 MHz and as such the wavelength can be about 22 meters. The loop antenna 510 can be a singular small loop antenna that performs transmission and reception functions. The magnetic field from the loop antenna 510 can be of a sufficient strength to detect a metal beneath a dielectric (e.g., beneath ground) while the electric field is low enough as to not substantially impact a communication device.

The current source 430 can be converted into a power amplifier and then the power amplifier can be converted back into the current source 430. In one embodiment, the current source 430 can comprise a 1 kilowatt RF Generator Module and the loop tuner 440 of FIG. 4. The RF Generator Module can be modified to match low input impedance of the loop antenna 510. The RF Generator Module can comprise a set of transistors that function as a voltage controlled current source. In addition, the RF Generator Module can comprise an oscillator (e.g., 13.56 MHz oscillator) or oscillator can be removed and the current source 430 can be connected to a signal generator that facilitates use of different pulsing waveforms. In one embodiment, the current source 430 employs a swept signal.

Figure 6:
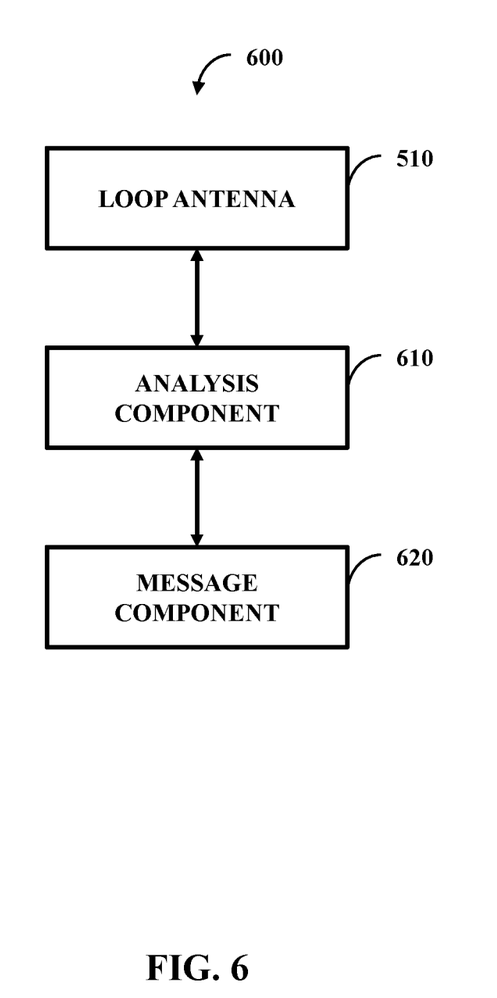
FIG. 6 illustrates one embodiment of a system comprising the loop antenna, an analysis component and a message component.

FIG. 6 illustrates one embodiment of a system 600 comprising the loop antenna 510, an analysis component 610 and a message component 620. In one embodiment, the loop antenna 510 can function with a tag (e.g., a radio frequency identification tag). The tag (e.g., physically separate and distant from the loop antenna 510) can produce an output in response to being subjected to the magnetic field. The analysis component 610 can be used to perform an analysis of this output from the tag. The message component 620 can produce a message that is based, at least in part, on a result of the analysis. In one example, the message is a light flashing that the tag is located and/or the message comprises identification information of the tag (e.g., when the tag functions as a barcode). In one embodiment the tag is a loop itself (e.g., separate from the loop antenna 510 and configured similarly to the loop antenna 510). Capacitors of the tag can have different values and/or a different number of capacitors from the loop antenna 510. The arrangement and/or values of the tag capacitors can represent information similar to that contained in a barcode and as such the tag can be used as an identification device that can be interpreted by the system 600. The tag can be a passive tag (e.g., totally passive tag) that functions as an asset management tag. The frequency of the magnetic field of the loop antenna 510 can provide additional information that can be provided to the tag. In one embodiment, the tag and loop antenna 510 can work together to create a current that is rectified to provide direct current that powers an active circuit (e.g., an active circuit connected to the tag). A circuit of the tag can alter characteristics of the loop antenna 510 (e.g., the tag employs the transistor switch 220 of FIG. 2 to change characteristics of the loop antenna 510). If characteristics of the loop antenna 510 are altered in a binary fashion by the tag, then the tag can return binary information in a trailing phase characteristic that is recognized by the analysis component 610. In one embodiment, the tag can be battery powered and operate as a semi-passive tag.

Figure 7:
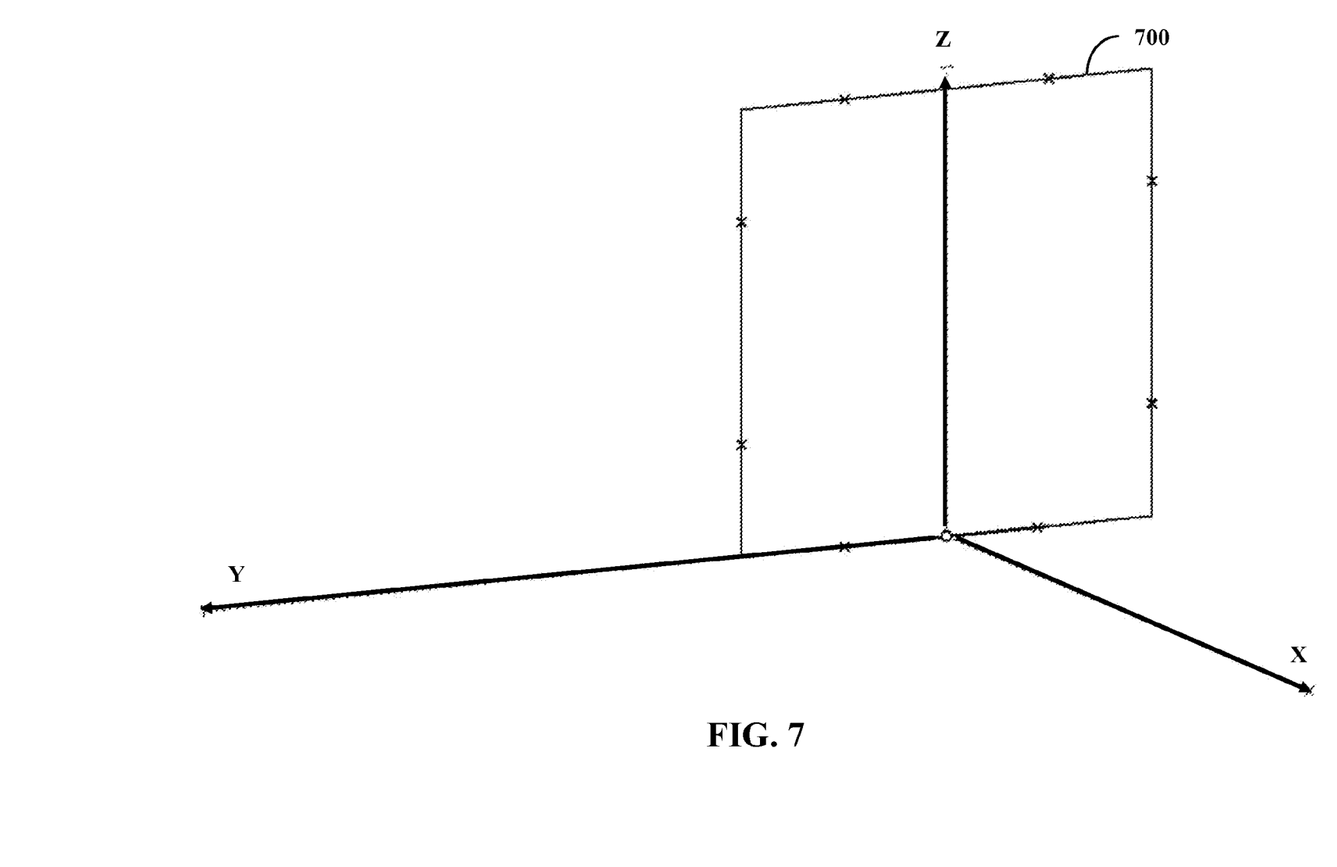
FIG. 7 illustrates one embodiment of a loop 700 with an x-axis, a y-axis and a z-axis.

FIG. 7 illustrates one embodiment of a loop 700 with an x-axis, a y-axis and a z-axis. The loop 700 can be raised above the ground plane (e.g., free space or ground with finite conductivity). The designation of 'o' of the loop 700 can be the source and the designations of 'x' of the loop 700 can be capacitor loads. The magnetic field can be substantially greater than the electric field down the x-axis such that it is the longitudinal axis of loop 700.

Figure 8:
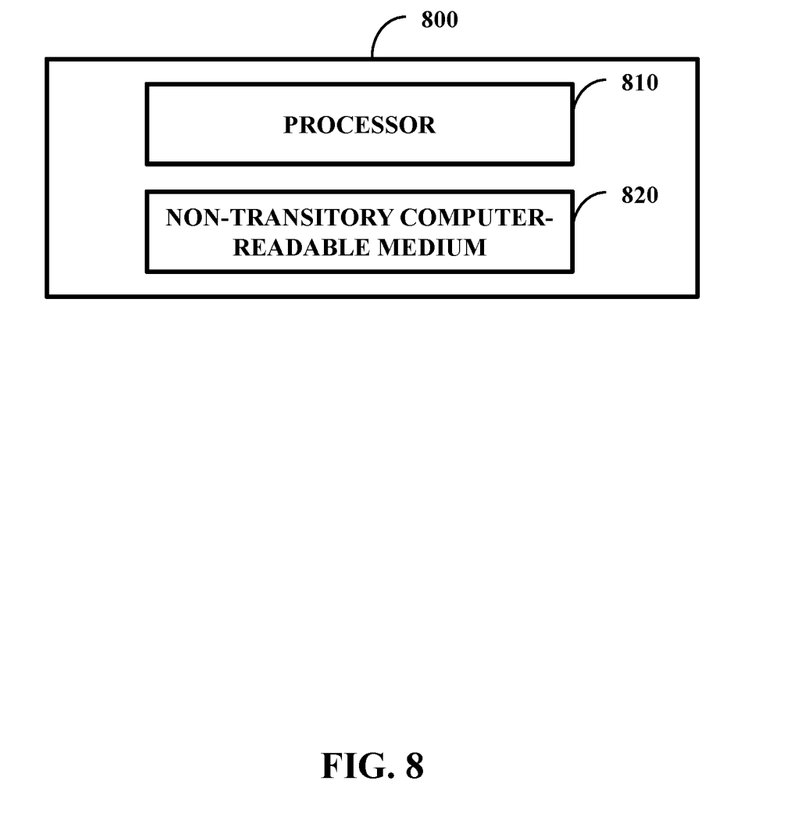
FIG. 8 illustrates one embodiment of a system comprising a processor and a non-transitory computer-readable medium.

FIG. 8 illustrates one embodiment of a system 800 comprising a processor 810 and a non-transitory computer-readable medium 820. In one embodiment, the non-transitory computer-readable medium 820 is communicatively coupled to the processor 810 and stores a command set executable by the processor 810 to facilitate operation of at least one component disclosed herein (e.g., the interpretation component 320 of FIG. 3). In one embodiment, at least one component disclosed herein (e.g., the analysis component 610 of FIG. 6 and/or the message component 620 of FIG. 6) can be implemented, at least in part, by way of non-software, such as implemented as hardware by way of the system 800. In one embodiment the non-transitory computer-readable medium 820 is configured to store processor-executable instructions that when executed by the processor 810 cause the processor 810 to perform a method disclosed herein (e.g., the methods 900 and 1000 discussed below).

Figure 9:
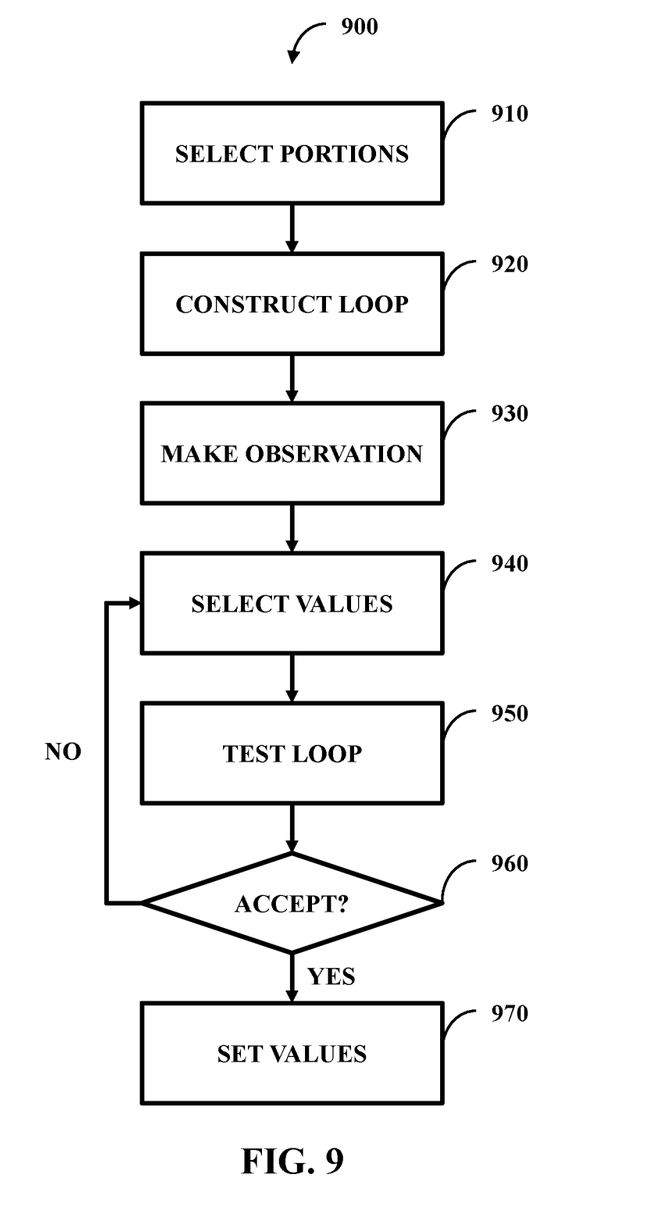
FIG. 9 illustrates one embodiment of a method comprising seven actions.

FIG. 9 illustrates one embodiment of a method 900 comprising seven actions. At 910, portions are selected for a loop such as a number of capacitors and a number of wire segments to be used in the loop. Other selections can be made such as length of the segments and in turn the overall size and/or shape of the loop. These selections can be based on user instruction, based on a desired output (e.g., for a set barcode configuration), etc. With these selections made, the loop can be constructed at 920.

An observation can be made on how the loop is ultimately constructed at 930 and values for the capacitors can be selected at 940. In one example, based on physical characteristics of the loop specific default capacitor values can be selected from a database. With the values selected the loop can be tested at 950 and a determination can be made at 960 if results are acceptable such as if the magnetic field is strong enough, if the electric field is weak enough, if the loop is identifiable as a barcode, etc. If results are acceptable from the selected values, then the selected values can become the values for the loop at 970.

If results are not acceptable, then the values can be reselected and the method 900 can return to action 940. In one example, a series of selections can be made at 940 and ultimately a selection that produces a best result (e.g., highest magnetic field with the lowest electric field) can be selected. This best resulting selection can be implemented for the loop at 970.

Figure 10:
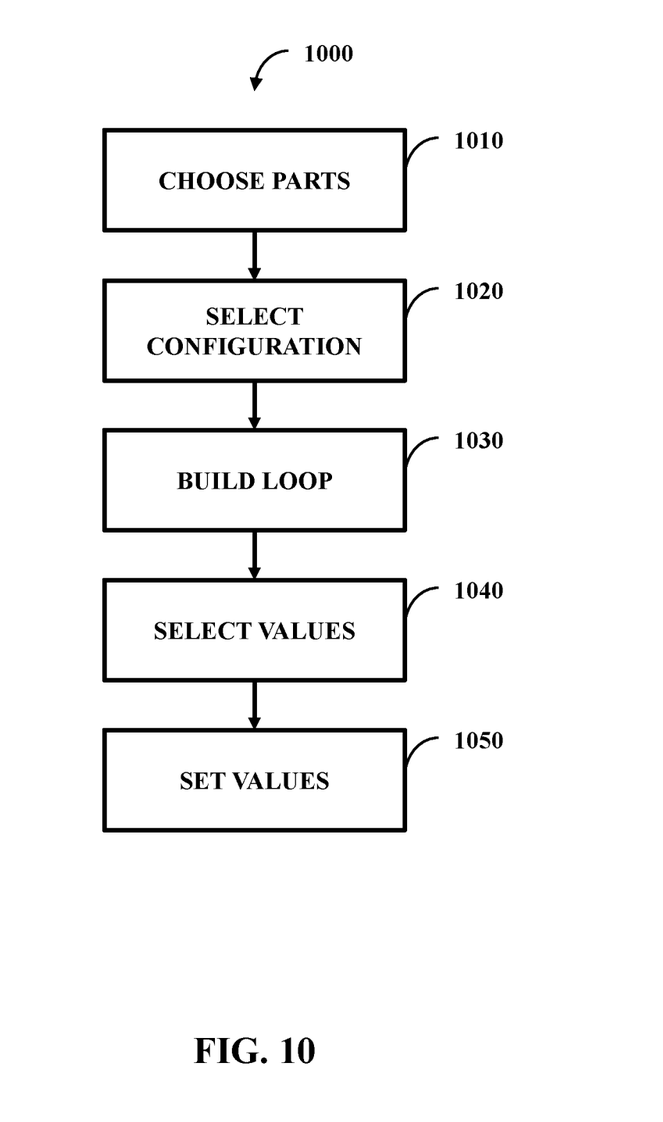
FIG. 10 illustrates one embodiment of a method comprising five actions.

FIG. 10 illustrates one embodiment of a method 1000 comprising five actions. The method 1000 can be employed in producing a loop that can function as a barcode. Parts can be chosen at 1010 including a number of capacitors, a number of wire sections, length of the wire section, brand of the capacitors, tolerance of the capacitors, etc. Along with choosing parts, a configuration can be selected at 1020. The configuration selection can be how far spaced capacitors are from one another, if spacing is uniform or non-uniform, etc. Part choice and configuration selection can take place concurrently and/or in conjunction with one another. In one example, selection of the number of capacitors can be selected in view of how the capacitors are to be spaced from one another.

The loop can be built at 1030 with the parts chosen at 1010 in accordance with the configuration selected at 1020. Values for the capacitors can be selected at 1040 with the goal of producing a specific barcode in view of the parts and configuration. The values can be set at 1050 and the loop can be deployed. Actions of methods disclosed herein can be practiced in a different order than disclosed when practical, such as the values being selected and set before construction of the loop.

What is claimed is:

1. A singular loop antenna, comprising:
a first wire section;
a second wire section that is distinct from the first wire section;
a third wire section that is distinct from the first wire section and distinct from the second wire section, where the first wire section and the third wire section are not contiguous;
a first reactive compensation element that divides the first wire section from the second wire section; and
a second reactive compensation element that divides the second wire section from the third wire section and that is distinct from the first reactive compensation element,
where the first wire section, the second wire section, the third wire section, the first reactive compensation element, and the second reactive compensation element form at least part of a loop powered by a current of at least two amps supplied from a low impedance current source,
where the singular loop antenna, when supplied with the current, produces a magnetic field that is substantially greater than an electric field along a longitudinal axis of the singular loop antenna,
where the first reactive compensation element offsets an impedance of the first wire section,
where the second reactive compensation element offsets an impedance of the second wire section,
where a magnitude is kept substantially constant throughout the loop such that a magnitude change is not greater than that which is produced by no more than one of the wire sections, and
where a phase is kept substantially constant throughout the loop such that a phase change is not greater than that which is produced by no more than one of the wire sections.

2. The singular loop antenna of claim 1, where the magnetic field extends about one wavelength from the loop, where a frequency of the singular loop antenna is between about 1 Megahertz to about 1 Gigahertz, where the singular loop antenna performs transmission and reception functions, and where the singular loop antenna is a singular small loop antenna.

3. The singular loop antenna of claim 2, where the magnetic field is of a sufficient strength to detect a metal, where the first reactive compensation element has a value that causes the electric field to be minimized, where the second reactive compensation element has a value that causes the electric field to be minimized, and where the electric field is low enough as to not substantially impact a communication device.

4. The singular loop antenna of claim 3, where characteristics of the loop are altered in a binary manner such that direct current is produced and where the direct current powers an active circuit wirelessly.

5. A singular loop antenna, comprising:
a first wire section;
a second wire section that is distinct from the first wire section;
a third wire section that is distinct from the first wire section and distinct from the second wire section, where the first wire section and the third wire section are not contiguous;
a first reactive compensation element that divides the first wire section from the second wire section; and
a second reactive compensation element that divides the second wire section from the third wire section and that is distinct from the first reactive compensation element,
where the first wire section, the second wire section, the third wire section, the first reactive compensation element, and the second reactive compensation element form at least part of a loop powered by a current of at least two amps supplied from a low impedance current source,
where the singular loop antenna, when supplied with the current, produces a magnetic field and an electric field,
where the magnetic field is substantially greater than the electric field along a longitudinal axis of the singular loop antenna,
where the first reactive compensation element offsets an impedance of the first wire section,
where the second reactive compensation element offsets an impedance of the second wire section,
where a magnitude is kept substantially constant throughout the loop such that the magnitude change is not greater than that which is produced by no more than one of the wire sections,
where a phase is kept substantially constant throughout the loop such that the phase change is not greater than that which is produced by no more than one of the wire sections, and
where a frequency of the singular loop antenna is between about 1 Megahertz to about 1 Gigahertz.

6. The singular loop antenna of claim 5, where the magnetic field extends about one wavelength from the loop.

7. The singular loop antenna of claim 5, where the singular loop antenna performs transmission and reception functions.

8. The singular loop antenna of claim 5, where the singular loop antenna is a singular small loop antenna.

9. The singular loop antenna of claim 5, where the magnetic field is of a sufficient strength to detect a dielectric.

10. The singular loop antenna of claim 5, where the magnetic field is of a sufficient strength to detect a metal.

11. The singular loop antenna of claim 5, where the first reactive compensation element has a value that causes the electric field to be minimized.

12. The singular loop antenna of claim 5, where the second reactive compensation element has a value that causes the electric field to be minimized.

13. The singular loop antenna of claim 5, where the electric field is low enough as to not substantially impact a communication device.

14. The singular loop antenna of claim 5, where characteristics of the loop are altered in a binary manner such that a direct current is produced.

15. The singular loop antenna of claim 14, where the direct current powers an active circuit wirelessly.

16. A singular small loop antenna operating at less than about one-quarter of a wavelength, comprising:
a first wire section;
a second wire section that is distinct from the first wire section;
a third wire section that is distinct from the first wire section and distinct from the second wire section, where the first wire section and the third wire section are not contiguous;
a first reactive compensation element that divides the first wire section from the second wire section; and
a second reactive compensation element that divides the second wire section from the third wire section and that is distinct from the first reactive compensation element,
where the first wire section, the second wire section, the third wire section, the first reactive compensation element, and the second reactive compensation element form at least part of a loop powered by a current of at least two amps supplied from a low impedance current source,
where the singular small loop antenna, when supplied with the current, produces a magnetic field that is substantially greater than an electric field along a longitudinal axis of the singular small loop antenna,
where the first reactive compensation element offsets an impedance of the first wire section,
where the second reactive compensation element offsets an impedance of the second wire section,
where a magnitude is kept substantially constant throughout the loop such that the magnitude change is not greater than that which is produced by no more than one of the wire sections,
where a phase is kept substantially constant throughout the loop such that the phase change is not greater than that which is produced by no more than one of the wire sections.

17. The singular small loop antenna of claim 16,
where the first reactive compensation element has a value that causes the electric field to be minimized,
where the second reactive compensation element has a value that causes the electric field to be minimized, and
where the singular small loop antenna performs transmission and reception functions.

18. The singular small loop antenna of claim 17,
where the magnetic field extends about one wavelength from the loop, where a frequency of the singular small loop antenna is between about 1 Megahertz to about 1 Gigahertz,
where characteristics of the loop are altered in a binary manner such that direct current is produced, and
where the direct current powers an active circuit wirelessly.

19. The singular small loop antenna of claim 17,
where the magnetic field is of a sufficient strength to detect a metal and
where the electric field is low enough as to not substantially impact a communication device.

20. The singular small loop antenna of claim 17,
where the magnetic field is of a sufficient strength to detect a dielectric and
where the electric field is low enough as to not substantially impact a communication device.

* * * * *